LEVER ADDER

Filed Feb. 23, 1960

INVENTOR.
HERBERT F. WELSH
BY Edward M. Fassell

Jan. 1, 1963

H. F. WELSH

LEVER ADDER 3,071,319

Filed Feb. 23, 1960

2 Sheets-Sheet 2

INVENTOR.
HERBERT F. WELSH

BY Edward M. Farrell

ATTORNEY

United States Patent Office 3,071,319
Patented Jan. 1, 1963

3,071,319

LEVER ADDER

Herbert F. Welsh, Philadelphia, Pa., assignor to Sperry Rand Corporation, New York, N.Y., a corporation of Delaware Filed Feb. 23, 1960, Ser. No. 10,374
7 Claims. (Cl. 235—61)

This invention relates to mechanical adding devices, and more particularly to mechanical adding devices for providing a discrete output function variable in accordance with a plurality of input functions.

Mechanical adding devices in different forms have been used in the past. In many systems involving a high degree of accuracy, however, most such devices used heretofore have proven to be unsatisfactory for various reasons. A major reason for the unsatisfactory performance of many mechanical adding devices is that the output characteristics of such devices are not exactly linear and proportional to the sums of the input functions or variable characteristics. In some cases, means for compensating for the nonlinearity of such devices must be employed if high accuracy is required. The need for compensating means generally results in relatively complicated and expensive devices. Also, the use of such compensating means often results in other problems, since the compensating means may itself introduce undesired variables into a system.

Another unsatisfactory feature found in many mechanical adding devices used heretofore has been that they often involve a large number of movable parts. Excessive movement of the various parts, generally involving a large number of pivot points, results in much friction and wearing of parts due to excess rubbing. Periodic adjustment to compensate for this excess wear is necessary if a high degree of precision is required.

In most mechanical adding devices, the characteristic relating to distance is generally important. For example, it is often desirable to produce an output movement of an element a distance which is precisely variable in accordance with the sum of distances moved by a plurality of input elements.

One important embodiment illustrating the importance of precision mechanical adding devices relates to a magnetic head positioning system in connection with a magnetic drum mass storage device. Such a drum device generally includes mass storage of data in the form of magnetized areas on the surface of the drum in the form of binary coded signals. A portion of a drum's surface which passes beneath a magnetic head is called a track. A drum may contain as many as one thousand or more tracks. When a single magnetic head is used for the reading or writing of data on a particular track of the drum, the magnetic head must first be precisely positioned over a selected track before the reading or writing operation starts.

It is an object of this invention to provide an improved mechanical adder which provides a linear output function proportional to the sum of a plurality of input functions.

It is a further object of this invention to provide an improved mechanical adder in which friction and wearing of parts are minimized.

It is still a further object of this invention to provide an improved mechanical adder which involves a minimum number of parts and which is relatively simple and inexpensive to manufacture.

It is still a further object of this invention to provide an improved mechanical adder or lever arm in which an output element is made to move a distance linear and proportional to the distances moved by a plurality of input elements.

It is still a further object of this invention to provide an improved mechanical adder suitable for precision positioning of a magnetic head over a selected track of a magnetic drum.

In accordance with the present invention, a mechanical adder for producing a linear output function proportional to the sum of a plurality of input functions is provided. A plurality of concentric sectors free to move in a plane are coextensively disposed and maintained in a fixed spaced relationship with respect to each other. Means for applying input forces to move two of the sectors are provided to cause a third sector to be moved a distance linear and proportional to the sum of distances moved by said two sectors.

Other objects and advantages of the present invention will be apparent and suggest themselves to those skilled in the art from a reading of the following specification and claims, in conjunction with the accompanying drawings, in which:

FIGURE 1*a*, 1*b* and 1*c* are sketches illustrating the basic principle involved in the present invention;

Before describing various specific embodiments of the present invention, the general principle underlying the invention will be first described. In order to design a mechanical adder or lever arm, in accordance with the present invention, the general dimension of the lever involved is first defined.

Figure 1A:
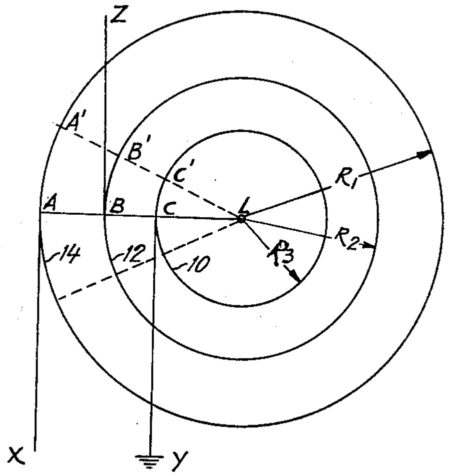

Referring particularly to FIGURE 1*a*, the points A, B and C define the various force points of a lever which is in the form of three wheels or circles. The lever is extended to some arbitrary point L which becomes the center of three concentric circles, i.e. an inner circle 10, a center circle 12 and an outer circle 14. The center of the circles L passes through points A, B and C. The circles 10, 12 and 14 have straps or other types of flexible members Y, Z and X, respectively, attached thereto. The center strap Z is attached to the circle 12 in the opposite direction than the straps X and Y. The force along Z opposes the forces applied to X or Y. The only parts of the circles 10, 12 or 14 which are of importance, as far as the present invention is concerned, are at the points where the straps are tangents thereto. In actual practice, the working area of the lever becomes a pie-shaped section as indicated by dotted lines. In designing a lever device in accordance with the present invention, the remainder of the circles outside the dotted lines may be removed. However, for purposes of explanation, the entire circle is retained.

FIGURE 1*a* may be considered as illustrating a lever arm at rest. Suppose now that strap X is pulled down in an amount equal to an arc AA′ with the strap Y being maintained at a fixed point or grounded. Also assume that the center of the circles L is fixed.

Figure 1B:
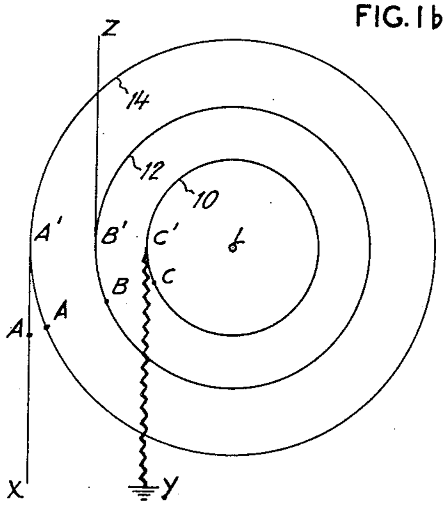

FIGURE 1*b* shows the condition of the lever when the force is applied to the strap X in the manner just described. It may be seen that the straps X and Z are tight and that the strap Y is loose when X is pulled down. The limpness of Y is equal to the length of the arc CC′. The output strap Z has moved downward a distance equal to the length of arc BB′.

Figures 1C, 2, 3:
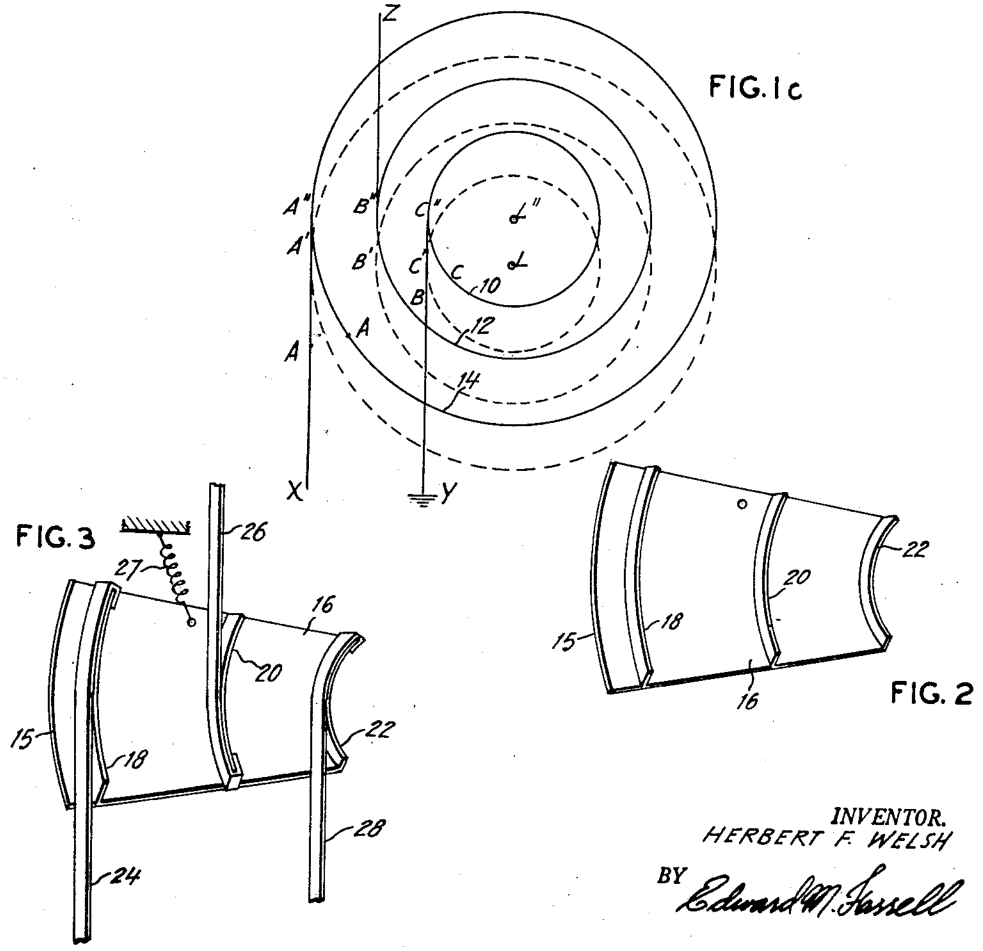
FIGURE 2 illustrates a lever arm, in accordance with the present invention.
FIGURE 3 illustrates the lever arm of FIGURE 2, together with means for actuating said lever arm.

Consider now what happens if the center L is free to move, in effect becoming a floating center. Under these conditions, the circles 10, 12 and 14 will rotate in a counterclockwise direction until Y is tight. This condition is illustrated by FIGURE 1*c*. In FIGURE 1*c*, the dotted lines may be considered the original positions of the circles 10, 12 and 14 with the solid circles being the positions of the circles after a force as described has been applied to the strap X and L is permitted to float freely.

It may be seen from FIGURE 1*c* that when the center L is free to float, the circles 10, 12 and 14 will move in an upward direction. This may be viewed as if the circle 14 is rolling up the strap X, the strap Z is being wound on the circle 12, and the circle 10 is unwinding the strap Y. The strap X unwinds faster than the strap Y and the process will continue until the neutral position A″, B″, C″ and L″ is located. These four points will be parallel to the initial points A, B, C and L (FIGURE 1*a*).

It is noted that throughout the movement described, the arm of action, that is, the distance between A, B and C, is maintained and that the lines of force are still the same distance apart as they were initially. The movement of the strap Z is therefore linearly proportional to the input movements of the straps X and Y. In many lever devices used heretofore, the arm of action or distance between the lines of input and output forces changed during operation. This variation or change in the arm of action during operation is one of the factors which cause nonlinearity between input and output elements in systems involving the adding of distance movements of a number of input elements.

When the strap Y is pulled down instead of strap X, the circles 10, 12 and 14 will rotate clockwise and be moved in a downward direction. This means that the straps X and Y will wind up, the strap Z will unwind and the center L will move downwards.

It is seen that a mechanical adder designed to operate on the principle described may be considered as an analog device which may be adapted to receive a coded digitized input and whose output is the analog sum of the weighted digit input. This will be true if the straps X and Y are adapted to be moved unit distances as by the operation of solenoids or other devices as will be seen.

In designing a lever arm in accordance with the present invention, the radii of the circles 10, 12 and 14 may have different proportions with respect to each other than those illustrated. The proportions of radii chosen is dependent upon the leverage ratio desired. The force at Z and, consequently, the distances which the circle 12 and the strap Z are moved by input forces is dependent upon the radii of the circles 10 and 14.

Referring again to FIGURE 1*a*, consider the distance moved by the strap Z as the straps X and Y are caused to move various distances by input forces applied thereto. Assume first that a force is applied to X to move it a unit distance. The resultant distance which Z will move is determined as follows:

$$Z_R = \frac{r_2}{r_1 + r_2}(X_{IN})$$

where $Z_R$=distance Z is moved
$X_{IN}$=distance X is moved where $r_1 = R_1 - R_2$
$r_2 = R_2 - R_3$ If Y is caused to move, then:

$$Z_R = \frac{r_1}{r_1 + r_2}(Y_{IN})$$

where $Y_{IN}$=distance Y is moved.

If both X and Y are caused to be moved by input forces, then:

$$Z_R = \frac{r_1(Y_{IN}) + r_2(X_{IN})}{r_1 + r_2}$$

It is seen from the above that the resultant distance which Z is caused to be moved is linearly proportional to the sums of the distances moved by X and Y. The actual distance which Z is moved is dependent of the ratio of the radii of the circles employed.

Referring particularly to FIGURE 2, one form of mechanical adder or lever arm in accordance with the present invention and designed along the principle set forth in connection with FIGURES 1*a*, 1*b* and 1*c* is illustrated. A lever arm 15 includes a plate member 16 having mounted thereon a plurality of arcuate members 18, 20 and 22. The arcuate members are concentric and coextensively disposed and maintained in a fixed physical relationship with respect to each other. These arcuate members may be compared to the "pie" section of the circles 10, 12, 14, described in connection with FIGURES 1*a*, 1*b* and 1*c*, with the remaining parts and center of the circles being cut away.

Referring particularly to FIGURE 3, the lever arm shown in FIGURE 2 is illustrated together with actuating strap members 24, 26 and 28 for applying forces to the arcuate members 18, 20 and 22, respectively. These strap members may be cemented, riveted or otherwise suitably attached to the arcuate members.

Forces applied to either or both of the strap members 24 or 28 cause the strap members to move downward. This results in a force at the strap member 26 causing it to also move in a downward direction. The distance which strap member 26 moves corresponds to the sum of the distances moved by the strap members 24 and 28. The distance moved by the strap member 26 will be linear and proportional to the distances moved by the strap members 24 and 28.

As previously noted, the arcuate members 18, 20 and 22 are parts of concentric circles. The radii of the circles or arcs are determined by the lever ratio desired in the final design of the lever arm. For example, as previously indicated, the lever may be designed so that a movement of one input strap may have a different resultant effect than the movement of the other strap through the same distance, dependent upon the radii involved.

It is noted that the center of the circles or arcs is free to move in a plane. The lever arm 15 is connected to a fixed point by means of a tension spring 27. The tension spring provides means for returning the lever arm 15 to a neutral position when the lever arm is not operated. This fixed point may be the housing unit for the lever arm system. The surfaces of the arcuate members 18, 20 and 22 are perpendicular to the plate member 16. The straps 24, 26 and 28 may be constrained to move only in one plane if they are made equal in width to the arcuate members and if a cover plate (not illustrated) is attached to the arcuate members in parallel relationship to the plate member 16. The strap 26 is connected to the arcuate member 20 in the opposite direction to the straps 24 and 28 connected to the arcuate members 18 and 22, respectively.

It is noted that the lever arm 15 does not involve any pivot points which are subjected to excessive wear. Also, the friction between the straps and the arcuate members during operation of the lever arm is negligible since the straps actually roll or unroll onto the arcuate members. In view of the minimum amount of friction and wearing of parts involved, it is seen that maintenance and periodic adjustment to compensate for excessive wear of the various parts associated with the lever arm is minimized through the use of the present invention.

Figure 4:
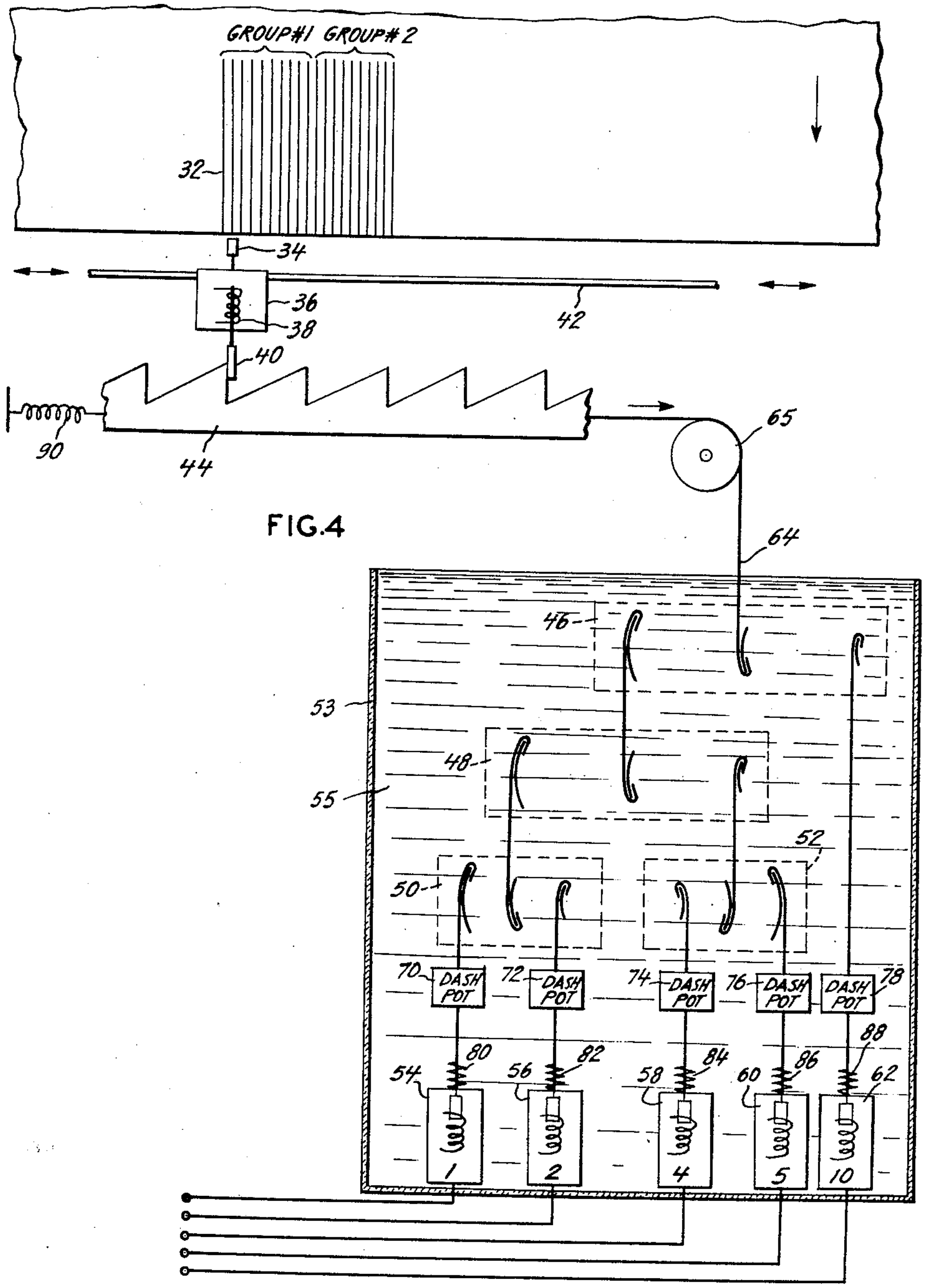
FIGURE 4 illustrates a magnetic head positioning system embodying the mechanical adder or lever arm of the present invention.

Referring particularly to FIGURE 4, an embodiment involving precision positioning of a magnetic head over a selected track of a magnetic drum is illustrated. Magnetic drums which include a large number of information tracks are well-known in the field of memory devices where quick access to stored data is required. In such devices, to save on the number of parts and cost involved, a single magnetic head is employed and is suitably moved over a desired selected track for reading or writing purposes. The magnetic head may be air-floated and moved along the surface of a rotating magnetic drum by suitable means, until it is disposed close to a particular selected track.

Many magnetic drums include as many as one thousand or more data tracks which are generally crowded within a relatively limited space. For purposes of explanation, in FIGURE 4, the data tracks are divided into groups, each containing ten data tracks designated group 1, group 2, etc. During operation, in the embodiment illustrated, the magnetic head is first roughly positioned over a particular group before precision positioning of the head over a selected track takes place. Precision positioning of the magnetic head over the selected track is most important to assure proper operation of any system involving the use of such magnetic drums.

In the embodiment shown, the magnetic drum 30 is rotated in the direction indicated by the arrow and includes a large number of data tracks 32 recorded thereon. A magnetic head 34 is carried by a carriage member 36. The carriage member includes a solenoid 38 which is adapted to retract a pawl member 40 when the carriage is carrying the head across the surface of the drum during the initial head positioning operation. The carriage 36 is driven by a belt 42 during this initial rough positioning period.

When the carriage 36 is moving, the pawl member 40 is maintained in a retracted position until the magnetic head 34 is positioned over the group which includes a particular selected track on the magnetic drum. In practical operation, a coding signal associated with an electronic circuit is used to cause the belt 42 to stop at the proper place to provide rough positioning of the magnetic head 34 over a group of tracks. When the magnetic head 34 is approximately positioned as over a group of tracks designated in the embodiment illustrated as group 1, the solenoid 38 is caused to become deenergized thereby permitting the pawl member 40 to fall within one of the teeth or cog areas of a saw-tooth shaped rack 44. Each of the teeth of the rack 44 is designed to be equal in width to a group of ten data tracks recorded on the magnetic drum 30. In the embodiment shown, each group includes ten data tracks but may, of course, include different numbers. After the proper group on the magnetic drum has been selected, the movement of the carriage 36 by the belt 42 is discontinued and the pawl member 40 comes into engagement with one of the teeth of the rack 44. The system is now ready for precision positioning of the head 34 over a particular data track within the group 1. The precision positioning of the magnetic head over a selected track may now be attained by utilizing the mechanical adding device or lever arm arrangement embodying the present invention.

A complete arrangement of lever arms to precisely adjust a magnetic head to any one of ten different positions is illustrated in FIGURE 4. This arrangement includes levers arms 46, 48, 50 and 52, each comprising three arcuate members. These lever arms operate on substantially the same principle as that described in connection with FIGURES 1*a*, 1*b* and 1*c*.

A plurality of solenoid devices 54, 56, 58, 60 and 62 are provided to actuate various lever arms. When actuated, each of the solenoids is adapted to move its associated core and the strap member attached thereto a unit distance. The movement of the solenoid 62 is designed to have ten times the effect as the movement of the solenoid 54, five times the effect of the solenoid 56, two and one half times the effect of the solenoid 58, and twice the effect of the solenoid 60. The combined output force resulting from the actuation of any one or more of the solenoids 54, 56, 58, 60 and 62 is applied to a strap 64. The strap 64, in turn, is connected through a pulley wheel 65 to move the rack 44, which is generally spring loaded. The rack 44 may be positioned into any one of twenty-two different positions depending upon the combination of solenoids actuated. In the head positioning being described, however, it is desired to position the rack to one of only ten different positions corresponding to the number of data tracks within a tooth area of the rack. When none of the solenoids 54, 56, 58, 60 and 62 are actuated, the system is at zero since the rack 44 is only held in position by the solenoid operation and not by any catch mechanism.

In the embodiment illustrated, actuation of the solenoids 54 and 56 causes the straps associated with the inner and outer arcuate members of the lever arm 50 to be moved a unit distance downward. Likewise, actuation of the solenoids 58 and 60 causes the straps associated with the inner and outer arcuate members of the lever arm 52 to be moved downward. The straps connected to the center arcuate members of the lever arms 50 and 52 become the input straps and provide means for applying input forces to the inner and outer arcuate members of the lever arm 48. The output strap from the center arcuate member of the lever arm 48 is connected to the outermost arcuate member of the lever arm 46, with a strap from the solenoid 62 being connected to the inner arcuate member. Finally, the strap 64 from the center arcuate member of the lever arm 46 is connected through the pulley wheel 65 to the rack 44.

One preferred form of the present invention provides that the entire arrangement of mechanical parts including the lever arm and solenoids be immersed in a glass or metal container 53 filled with oil 55. The oil provides means for damping the vibrations of the moving parts as well as providing lubrication. Vibrational energy is absorbed in fluid friction in the arrangement illustrated.

A plurality of dash pots 70, 72, 74, 76 and 78 are connected between the solenoids 54, 56, 58, 60 and 62, respectively and the lever arms. Spring members 80, 82, 84, 86, and 88 are connected between each of the dash pots and its associated solenoid.

A dash pot is a well known device to those skilled in the art as being a device for damping out vibration and generally consists of a piston attached to the part to be damped fitting loosely in a cylinder of oil. Vibrational energy is absorbed in the fluid friction involved in such devices. When any of the solenoids 54, 56, 58, 60 or 62 is actuated, its associated spring member is stretched or submitted to tension. Thus even though the solenoids may be operated quickly by the application of electrical signals thereto, the dash pots provide means for permitting the lever arms to be moved gradually into the position corresponding to the electrical signal applied to the solenoids. The spring 90 maintains the rack 44 in a neutral position when no forces are applied thereto.

The necessity of exact linearity in mechanical adding devices is easily seen in the present embodiment where precision positioning of the magnetic head 34 is required. It is seen that the output movement of a strap from one lever arm may become the input force to move another lever arm. Consequently, any slight error within any of the lever arms will be multiplied. The magnetic head 34, therefore, may be positioned over the wrong data track if the total output distance is not linear and proportional to the sum of the input distances moved. Other applications, other than head positioning arrangements, require extremely high accuracy in mechanical adders.

As for the order of operations, the rack 44 may be positioned first by means of the pawl arm 40 being first dropped into a selected tooth area and then moved by a servo mechanism, to engage a particular tooth of the rack. In some cases the pawl may be dropped into the selected area, and then pulled into its exact position by movement of the rack 44. The order of operations for rough and fine positioning is not critical and, in some cases, may be carried out simultaneously.

What is claimed is:

1. A mechanical adder device for producing a linear movement of an output element proportional to the sum of movements of a plurality of input elements comprising three concentric coextensive arcuate sectors maintained in a fixed spaced relationship with respect to each other, at least two of said sectors having different radii, means for connecting said input elements to two of said arcuate sectors, means for connecting said output element to the third of said arcuate sectors, and means for applying input forces to said input elements to produce a linear output movement of said output element proportional to the movements of said input elements, the lines of forces producing movements of said input and output elements being in substantially parallel relationship.

2. A lever adder device for producing a linear output movement of an output element proportional to the sum of movements of a plurality of input elements comprising a plurality of concentric coextensive sectors maintained in a fixed spaced relationship with respect to each other, said sectors having a common center point located outside all of said sectors, flexible members connecting said input and output elements to said sectors, and means for applying input forces to move said input elements, the movements of said input elements being transmitted to said sectors through said flexible members, the movement of said sectors being transmitted to said output element through one of said flexible members whereby a linear movement of said output element is produced proportional to the sum of movements of said input elements.

3. A lever arm for producing a linear output movement of an output element proportional to the sum of movements of a plurality of input elements comprising a plate member, inner, outer and centrally disposed concentric coextensive arcuate sectors maintained in a fixed spaced relationship with respect to each other disposed on said plate member, said sectors having a common center point located outside of all of said sectors, a pair of flexible straps connecting said input elements to the inner and outer sectors of said arcuate sectors, a third strap connecting said center sector to said output element, and means for applying input forces to move two of said input elements to produce a linear movement of said output element proportional to the movements of said input elements, the lines of forces producing the movements of said input and output elements being maintained in substantially parallel relationship and equally distanced during the operation of said lever arm.

4. A lever arm as set forth in claim 3 wherein said third strap is connected to said center sector in the opposite direction to the straps connected to said inner and outer sectors.

5. A lever arm as set forth in claim 3 wherein the center of said arcuate members is free to move when any of said arcuate members is moved.

6. A lever arm as set forth in claim 5 wherein said straps are dimensioned with respect to said arcuate members to restrict the movement of the center of said arcuate members to a single plane.

7. In a system including a movable rack disposed to position a magnetic head over a selected track of a magnetic drum, the combination comprising a plurality of lever arms for producing a linear movement of said rack proportional to the sum movements of a plurality of input elements, three concentric coextensive arcuate sectors maintained in a fixed spaced relationship with respect to each included in each of said lever arms, all of said sectors being disposed on the same side of a common center point, a flexible member attached to each of said arcuate sectors, means for connecting one of said flexible members to move said rack to position said magnetic head, and means for applying input forces to move selected ones of flexible members to produce a linear output movement of said rack proportional to the movements of said selected flexible members, the lines of forces applied to move said rack and said selected flexible members being maintained in substantially parallel relationship and equally distanced during the operation of said lever arm.

References Cited in the file of this patent

UNITED STATES PATENTS

| | | |
|---|---|---|
| 2,179,822 | Imm | Nov. 14, 1939 |
| 2,193,929 | Lion | Mar. 19, 1940 |
| 2,568,361 | Pettigrove | Sept. 18, 1951 |

FOREIGN PATENTS

| | | |
|---|---|---|
| 193,452 | Great Britain | Feb. 26, 1923 |
| 578,914 | Great Britain | July 17, 1946 |